Oct. 21, 1952  W. W. MILLER  2,614,460
OPTICAL IMAGING SYSTEM
Filed May 14, 1951
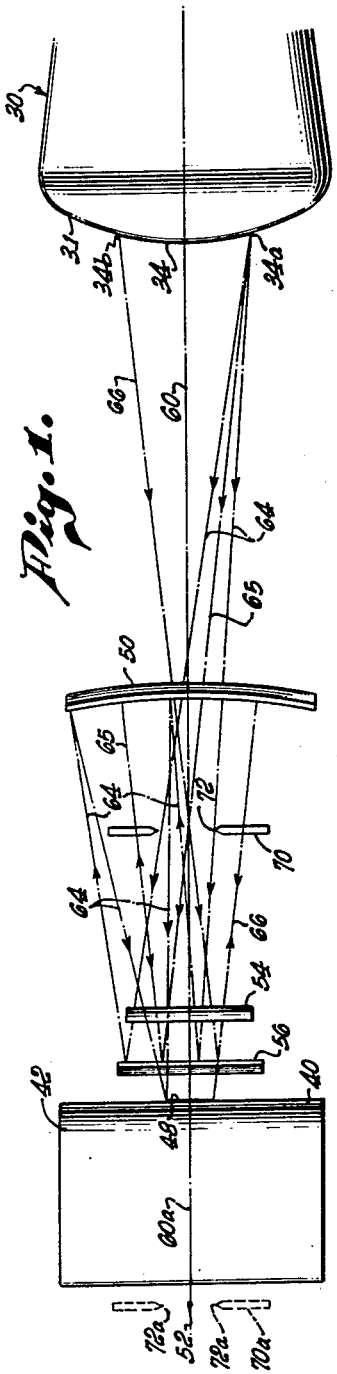
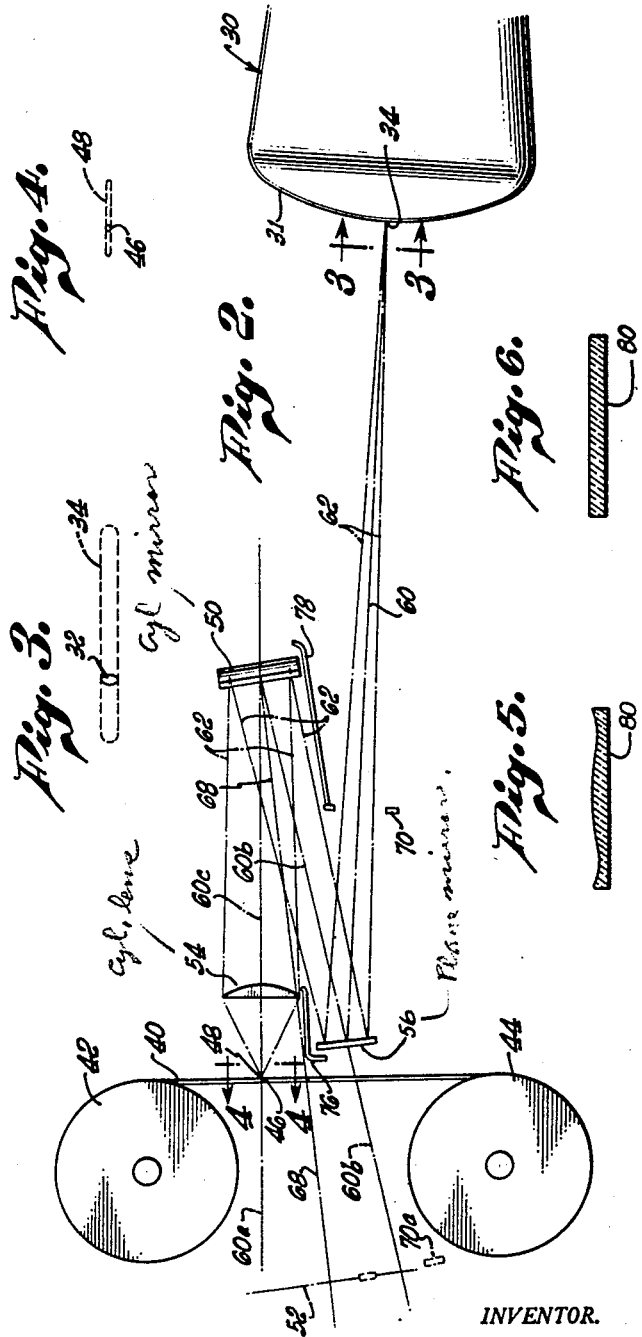
INVENTOR.
WILLIAM W. MILLER,
BY
Bakelew & Caulkebury
ATTORNEYS.

Patented Oct. 21, 1952

UNITED STATES PATENT OFFICE 2,614,460

OPTICAL IMAGING SYSTEM

William W. Miller, Los Angeles, Calif., assignor to William Miller Corporation, Pasadena, Calif., a corporation of California Application May 14, 1951, Serial No. 226,216

1 Claim. (Cl. 88—57)

This invention has to do with optical imaging systems, and pertains particularly to systems that form an image of an essentially two-dimensional object, the magnification being different for those two dimensions.

A known example of that type of system employs two cylindrical lenses arranged on a common optical axis between the object and the image, with the cylindrical axes of curvature of the lenses at right angles to the optical axis and to each other. Light from the object is then focused by each lens only in the plane normal to its axis of curvature, and the magnification for each dimension of the object can be independently controlled by suitable selection and location of the respective lenses. Systems of that type have been employed in connection with moving mirror galvanometers to image a slit or lamp filament on a moving photographic surface.

An important object of the present invention is to provide an optical system capable of imaging an object in the manner indicated, but with improved optical quality. Another object is to permit such imaging of an object that is relatively extended along at least one of its dimensions without loss of image quality. Furthermore, the invention permits appreciably greater light gathering power than is economically feasible with previous systems under comparable conditions of image size.

The invention is particularly useful for imaging the trace of a cathode ray, moving along a substantially linear path on the screen of a cathode ray oscilloscope, upon a moving photographic medium in order to record the position of the trace as a function of time. For that reason, and for clarity of description, the invention will be explained largely in terms of an illustrative embodiment adapted especially for that purpose. However, that description and the appended drawings which form a part of it are intended only as an illustration and not as a limitation upon the scope of the invention.

In the drawings:

Fig. 1 is a schematic plan, and

Fig. 2 is a corresponding elevation of an illustrative embodiment of the invention;

Figs. 3 and 4 are schematic elevations representing typical object and corresponding image in respective aspects indicated by the lines 3—3 and 4—4 in Fig. 2, and at enlarged scale; and Figs. 5 and 6 represent typical horizontal and vertical sections through a correcting plate of the type that may be added to the system of Figs. 1 and 2.

In the drawings a cathode ray tube is shown partially at 30, with its fluorescent screen 31 having the usual slightly convex spherical form. It is supposed for purposes of illustration that the cathode ray beam is deflected in a horizontal plane (plane of the paper in Fig. 1) in proportion to an impressed voltage, the variations of which it is desired to record. Throughout the present specification such terms as horizontal and vertical are employed only in a relative sense for clarity of description, and are not intended as limitations upon the actual orientation of the parts described. The luminous spot formed on screen 31 by the cathode ray beam is shown in a typical position at 32 in Fig. 3. The dotted line 34 represents the spot track, which is the area on the tube screen that is swept by spot 32 during the total course of its deflection. The vertical dimension of spot track 34 may be the actual height of spot 32, or may be artificially increased as by applying a relatively high frequency alternating current voltage to the vertical deflection elements of the cathode ray tube, effectively increasing the spot height without affecting its width. Spot 32 is illustratively shown about twice as high as it is wide, its height determining the vertical dimension of spot track 34. Track 34 is typically much longer horizontally than the dimensions of the spot itself. Although at any moment only the spot itself is appreciably luminous, the optical system must be capable of forming a sharp image of the spot regardless of its position along track 34. In effect, then, the entire spot track 34 represents the portion of the tube screen that must be sharply imaged on a recording surface. That area, which is indicated schematically as a point 34 in Fig. 2 and as a line 34 in Fig. 1, will be referred to for convenience as the object of the optical system to be described. The luminous track of the cathode ray beam on the fluorescent screen is described merely as an illustrative object, and it is to be understood that the optical system to be described, while particularly well adapted for forming an image of that type of object, is useful also in the same or in modified form for many other types of image formation.

As illustrated, the image receiving surface is a strip of light sensitive material 40, such as photographic film or paper, which is guided by means not shown from a supply spool 42 to a takeup spool 44. The latter spool may be driven in any suitable manner, preferably to move strip 40 at a uniform but variable speed, by means which it is unnecessary to describe here. The image of object 34 is represented by the dotted line 48 in Fig. 4, and the corresponding image of spot 32 at 46. Image 48 is represented schematically as a point 48 in Fig. 2 and as a line 48 in Fig. 1.

The image forming means of the present illustrative embodiment comprises a cylindrical mirror 50 having its axis of curvature in a vertical plane, as indicated schematically at 52; and a cylindrical lens 54 having its axis of curvature in a horizontal plane. A plane mirror is preferably, but not necessarily, included in the optical system, as shown illustratively at 56, to bend the optical system for convenience of arrangement with respect to other parts of the apparatus. For example, in the arrangement shown, mirror 56 avoids interference between takeup spool 44 and the optical system. Whereas mirror 56 is illustrated as a plane mirror, it may alternatively be curved cylindrically or otherwise and thus perform also a focusing function. The primary optical axis of the system is indicated at 60. Although actually comprising a number of straight portions intersecting at mirror faces, axis 60 may be considered to be projected behind the mirror surfaces in a manner well known in the art of construction of mirror images. In particular, it may be convenient to speak of the system without taking explicit notice of mirror 56, the portion of axis 60 between that mirror and cathode ray tube 30 being thought of as extending (together with associated optical parts) behind mirror 56 as indicated at 60b.

Light from any point of object 34 passes, in a beam limited by means to be described, substantially along optical axis 60 first to mirror 56, then along 60b to cylindrical mirror 50, and finally along 60c through cylindrical lens 54 to image receiving surface 40. That beam is focused by cylindrical mirror 50 in a generally horizontal plane, the plane of that focusing action being normal to mirror axis 52 and including the longer dimension of object 34 (Fig. 3). Cylindrical mirror 50 performs substantially no focusing function in a vertical plane, the beam being focused in that plane entirely by cylindrical lens 54. That preferred focusing action is clearly shown by the typical limiting rays 62 shown in Fig. 2, those rays being reflected in a vertical plane from mirror 50 substantially as if it were a plane mirror. As indicated by rays 62, object 34 and image receiving surface 40 lie in conjugate focal planes with respect to cylindrical lens 54. The magnification with which vertical dimensions of the object are imaged at 40 is given by the ratio of the focal distances, that is, the ratio of the optical separation of lens 54 from image 48 to its separation (measured along axis 60) from object 34. As illustrated, that ratio is approximately $\tfrac{1}{18}$, so that the image is very much reduced in vertical dimensions (the direction of movement of film 40) with respect to the object. (Compare Figs. 3 and 4, which illustrate the effect in question, although not necessarily to scale.)

In Fig. 1 the lines 64 represent limiting rays, in a horizontal plane, of the light beam that passes through the system from a typical point 34a near one end of object 34. Those rays indicate clearly the focusing action of cylindrical mirror 50, and the lack of any appreciable focusing of the rays in a horizontal plane by cylindrical lens 54, which acts in that plane substantially as a plane parallel plate. Image receiving surface 40 and object 34 are in conjugate focal planes with respect to mirror 50. Horizontal dimensions of object 34 are imaged at 40 with a magnification given by the ratio of the optical separation of mirror 50 from image 48 to that from image 34. As illustrated, that magnification is approximately $\tfrac{1}{3}$. The magnification for horizontal and for vertical dimensions of the object are thus quite different, and are independently variable within wide limits by suitable selection and arrangement in the system of the respective focusing elements 50 and 54.

In accordance with the present invention, the horizontal limits of the light beam from each point, such as 34a of the object are determined by a diaphragm, shown at 70, which is located optically substantially in the plane of the axis of curvature of cylindrical mirror 50. The diaphragm has beam limiting diaphragm edges 72, extending substantially vertically, which are oppositely spaced from, and substantially parallel to, that axis of curvature. That arrangement is indicated clearly in Fig. 1, where the physical position of the diaphragm is at 70 between 34, and mirror 56, and the optical position, as imaged in plane mirror 56, is indicated at 70a with the diaphragm edges 72a equally spaced on opposite sides of the axis of curvature 52 of cylindrical mirror 50.

For purposes of the present invention it is largely immaterial what detailed means are employed to limit the aperture of the light beam in a vertical direction. The relative separation of limiting rays 62 of Fig. 2 may be determined, for example, by the vertical dimension of cylindrical lens 54, of cylindrical mirror 50, of plane mirror 56 or of a special diaphragm introduced into the system at any suitable position for that express purpose. In particular, diaphragm 70 may be so constructed as to effectively limit the beam in both vertical and horizontal dimensions. Additional means may be provided for controlling light in the system, such, for example as the light baffles shown schematically at 76 and 78 in Fig. 2 but omitted from Fig. 1 for clarity of illustration.

An important advantage of the described manner of limiting the horizontal dimensions of the light beam from each object point is that each such beam then approaches cylindrical mirror 50 substantially along a radius to its surface, or, more exactly, in an axial plane. That result is shown by the fact that the axis 65 of the ray bundle (limited by rays 64 which just pass diaphragm 70) appears, as seen in Fig. 1, to intersect the surface of mirror 50 normally, and to be reflected directly upon itself. Actually the incident and reflected beams deviate in a vertical plane, as will be explained. But beam axis 65, both when incident upon and when reflected from mirror 50, lies in a plane through the axis of curvature 52 of the mirror. The same is true for each object point, as further illustrated specifically for object point 34b. For that point only beam axis 66 is shown in Fig. 1, the limiting rays of the beam being omitted for clarity of illustration.

Because each ray bundle meets cylindrical mirror 50 in an axial plane of the latter, optical aberrations such as coma are avoided, and spherical aberration is the only practically important limit on image sharpness in the horizontal plane, regardless (within practicable limits) of the horizontal extent of object 34. The spherical aberration of mirror 50 may be held to a negligible amount by limiting the aperture of diaphragm 70, as seen in Fig. 1, to a suitable fraction of the focal length of the mirror. As illustrated, the separation of diaphragm edges 72 is only about $\tfrac{1}{12}$ of the radius of curvature of mirror 50, or of its focal length, giving a focal ration of $f/6$., at which spherical aberration is satisfactorily small. At larger apertures a specially shaped lens or correcting plate 80 is preferably inserted in the optical system at diaphragm 70 (that is, optically at the axis of curvature of the mirror). Such a plate may be so formed that a horizontal section through any part of it (as indicated in Fig. 5) has substantially the same form as an axial section through a conventional Schmidt correcting plate as used with a spherical mirror of the same radius of curvature as cylindrical mirror 50. A vertical section through such a plate is of simple rectangular form (as indicated typically in Fig. 6), the thickness of the section depending upon the horizontal level at which the section is taken. The effect upon the system of such a one-dimensional correcting plate is to transmit light with substantially no deviation in a vertical plane, and to produce by refraction in a horizontal plane at each point of the beam cross-section the proper deviation to substantially compensate the spherical aberration introduced by mirror 50. With such a correcting plate in the system, the focal ratio of the system with respect to mirror 50 can be increased far beyond that shown illustratively in Fig. 1, correspondingly increasing the brightness of the image formed by the system.

Further in accordance with the invention, and as shown best in Fig. 2, mirror 50 is mounted with its axis of curvature 52 intersecting primary optical axis 60 (as projected at 60a) at an oblique angle. The primary optical axis segments 60b and 60c for light respectively incident upon and reflected from mirror 50 therefore do not coincide, though lying in a common vertical axial plane of the mirror as already described, but are oblique with respect to each other and to a radius 68 drawn to the mirror surface at their intersection therewith. Thus the path of the reflected light deviates in a vertical plane from that of the incident light, facilitating the physical separation of the two beams in the system, and the corresponding physical separation from each beam of optical components associated with the other beam. That separation of incident and reflected beams is accomplished without introducing any appreciable optical aberrations into the system. Since the obliqueness of the mirror is confined to a plane through its axis of curvature 52, it does not destroy the axial relationship already explained in connection with Fig. 1 and diaphragm 70. The system therefore avoids one of the most troublesome problems ordinarily associated with reflective optics, that of physically separating the incident and reflected beams. And that problem is solved without reducing the effective aperture of the system and without intrdoucing any appreciable optical aberrations. Moreover, where the object is substantially linear in character, even a relatively very long object can be handled by the present system without any complication of structure or mounting, with highly satisfactory definition and with relatively great light gathering power as compared with previously known systems.

For simplicity of design and construction it is preferred that each focusing element, represented in the present illustrative embodiment by mirror 50 and lens 54, be strictly "cylindrical" in type so that it has no focusing effect in one plane. However, one or both of the elements may be somewhat toroidal in form, focusing the light more strongly in one plane than the other. Lens 54 may, of course, comprise more than one component, and may also be replaced by a cylindrical (or toroidal) mirror. When a cylindrical mirror performs the focusing function of lens 54, it is desirable although not necessary to position it obliquely and to provide a beam limiting diaphragm in substantially the plane of its axis of curvature, in the manner already described with respect to mirror 50; that diaphragm then determining the aperture of the system in a vertical plane.

I claim:

An optical image forming system for imaging an elongated object at reduced scale, the reduction being greater transversely of the object than longitudinally thereof, said system comprising in combination means defining an incident beam of radiant energy diverging from the object and having an incident beam axis substantially normally bisecting the length of the object, a concave circularly cylindrical mirror transverse of the incident beam and producing therefrom a reflected beam having a reflected beam axis, the axis of curvature of the mirror substantially intersecting the incident beam axis at an oblique angle between the mirror and the object in a common plane substantially normal to the length of the object, whereby the reflected beam axis lies substantially in the said common plane and diverges from the incident beam axis at an oblique angle, a cylindrically curved lens transverse of the reflected beam axis in a transverse plane between the mirror and its said axis of curvature, the said oblique angle of beam divergence being sufficiently great that at the said transverse plane the incident and reflected beams are mutually spaced apart in non-overlapping relation, the lens being spaced transversely from the incident beam axis and lying wholly outside of the incident beam, the focal length of the lens being small compared to that of the mirror, and the cylindrical axis of curvature of the lens being substantially normal to that of the mirror and parallel to the length of the object, and image receiving means transverse of the reflected beam axis at a distance from the mirror greater than that of the lens and less than that of the mirror axis of curvature, the image receiving means and the object lying in respective conjugate focal planes with respect to the cylindrical mirror and also lying in respective conjugate focal planes with respect to the cylindrical lens, the said beam defining means for the incident beam including a diaphragm lying in a plane substantially normal to the incident beam axis at the axis of curvature of the mirror, and having two substantially parallel spacedly opposed beam defining edges extending longitudinally of, and oppositely spaced from, the axis of curvature of the mirror, the said diaphragm edges being separated by a distance that is small compared to the corresponding dimension of the mirror, whereby the respective points of the object are imaged by ray bundles of substantially equal cross section, each ray bundle lying substantially in an axial plane of the mirror.

WILLIAM W. MILLER.

REFERENCES CITED

The following references are of record in the file of this patent:

UNITED STATES PATENTS

| Number | Name | Date |
|---|---|---|
| 1,747,261 | Poulson | Feb. 18, 1930 |
| 1,753,222 | Timoney | Apr. 8, 1930 |
| 1,829,634 | Chretien | Oct. 27, 1931 |
| 2,193,422 | Jeffree | Mar. 12, 1940 |
| 2,236,420 | Bergmans et al. | Mar. 25, 1941 |
| 2,252,246 | Bergmans et al. | Aug. 12, 1941 |
| 2,410,550 | Padva | Nov. 5, 1946 |
| 2,540,417 | Bergmans et al. | Feb. 6, 1951 |